(12) United States Patent
Maier et al.

(10) Patent No.: US 7,992,914 B2
(45) Date of Patent: Aug. 9, 2011

(54) SEAT ARRANGEMENT WITH A FORCED GUIDANCE

(75) Inventors: Jürgen Maier, Weitersweiler (DE); Jens Winter, Gau-Bischofsheim (DE); Thomas Dill, Heiligenmoschel (DE); Heinrich Hammann, Teschenmoschel (DE); Viktor Enns, Kaiserslautern (DE); Ulf Schäffling, Gaugrehweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 175 days.

(21) Appl. No.: 12/353,472

(22) Filed: Jan. 14, 2009

(65) Prior Publication Data

US 2009/0230712 A1  Sep. 17, 2009

(30) Foreign Application Priority Data

Jan. 14, 2008  (DE) .................. 10 2008 004 231

(51) Int. Cl.
B60N 2/02 (2006.01)
(52) U.S. Cl. ..................... 296/65.13; 248/349
(58) Field of Classification Search .............. 296/65.13, 296/64, 63, 65.01, 65.11; 248/429
See application file for complete search history.

(56) References Cited

U.S. PATENT DOCUMENTS

| | | | | |
|---|---|---|---|---|
| 2,132,009 A | * | 10/1938 | Ball | 248/394 |
| 3,790,234 A | * | 2/1974 | Fuelling et al. | 384/34 |
| 4,395,011 A | * | 7/1983 | Torta | 248/393 |
| 4,488,699 A | * | 12/1984 | Chevalier | 248/396 |
| 5,014,958 A | * | 5/1991 | Harney | 248/394 |
| 5,112,018 A | * | 5/1992 | Wahls | 248/394 |
| 5,575,531 A | * | 11/1996 | Gauger et al. | 297/362.11 |
| 6,155,626 A | * | 12/2000 | Chabanne et al. | 296/65.03 |
| 6,299,121 B1 | * | 10/2001 | Brault | 248/429 |
| 6,695,275 B2 | * | 2/2004 | Schuler et al. | 248/424 |
| 7,708,331 B2 | * | 5/2010 | Yamasaki | 296/65.13 |
| 2010/0098357 A1 | * | 4/2010 | Beneker et al. | 384/34 |

FOREIGN PATENT DOCUMENTS

| | | |
|---|---|---|
| DE | 4110998 A1 | 10/1992 |
| DE | 102006022732 A1 | 11/2007 |
| DE | 102006037344 A1 | 2/2008 |
| EP | 0940288 A2 | 9/1999 |
| EP | 1140554 A1 | 10/2001 |
| EP | 1488951 A1 | 12/2004 |
| JP | 7108864 A | 4/1995 |
| WO | 2007131761 A1 | 11/2007 |

OTHER PUBLICATIONS

German Patent Office, German Office Action for German Application No. 102008004231.5, Mar. 25, 2010.
German Patent Office, German Office Action for German Application No. 102008004231.5, Jun. 26, 2008.
European Patent Office, European Search Report for European Application No. 09000290.8, May 31, 2010.

* cited by examiner

*Primary Examiner* — Kiran B. Patel
(74) *Attorney, Agent, or Firm* — Ingrassia Fisher & Lorenz, P.C.

(57) ABSTRACT

A seat arrangement is provided for an automobile comprising a vehicle seat, a longitudinal guide for displacement of the vehicle seat in the longitudinal direction, and a transverse guide for displacement of the vehicle seat in the transverse direction. A forced guidance is furthermore provided, this being configured in such a manner that during displacement in the longitudinal or transverse direction, the vehicle seat is automatically also displaced in the transverse or longitudinal direction.

16 Claims, 3 Drawing Sheets

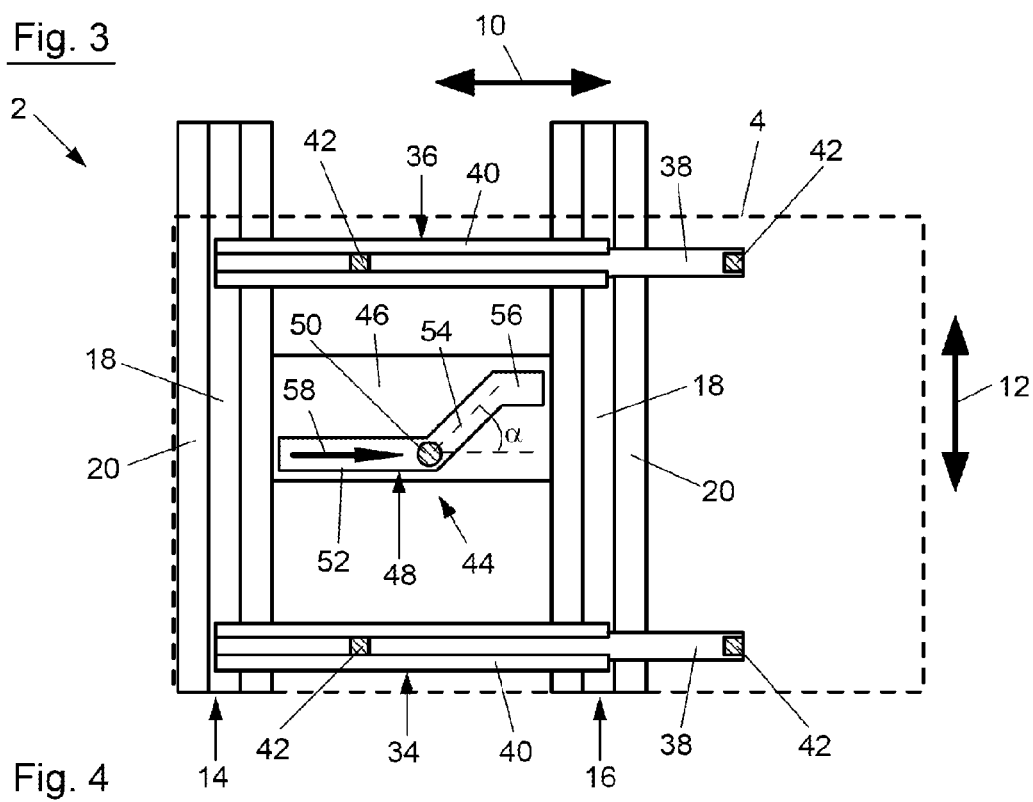
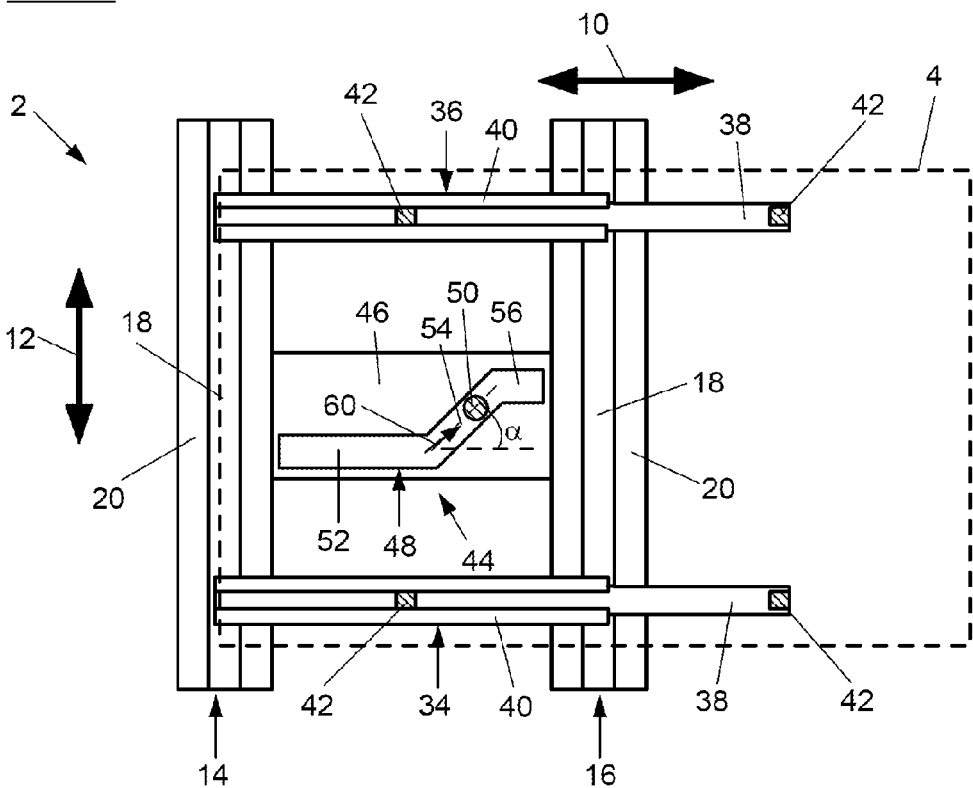

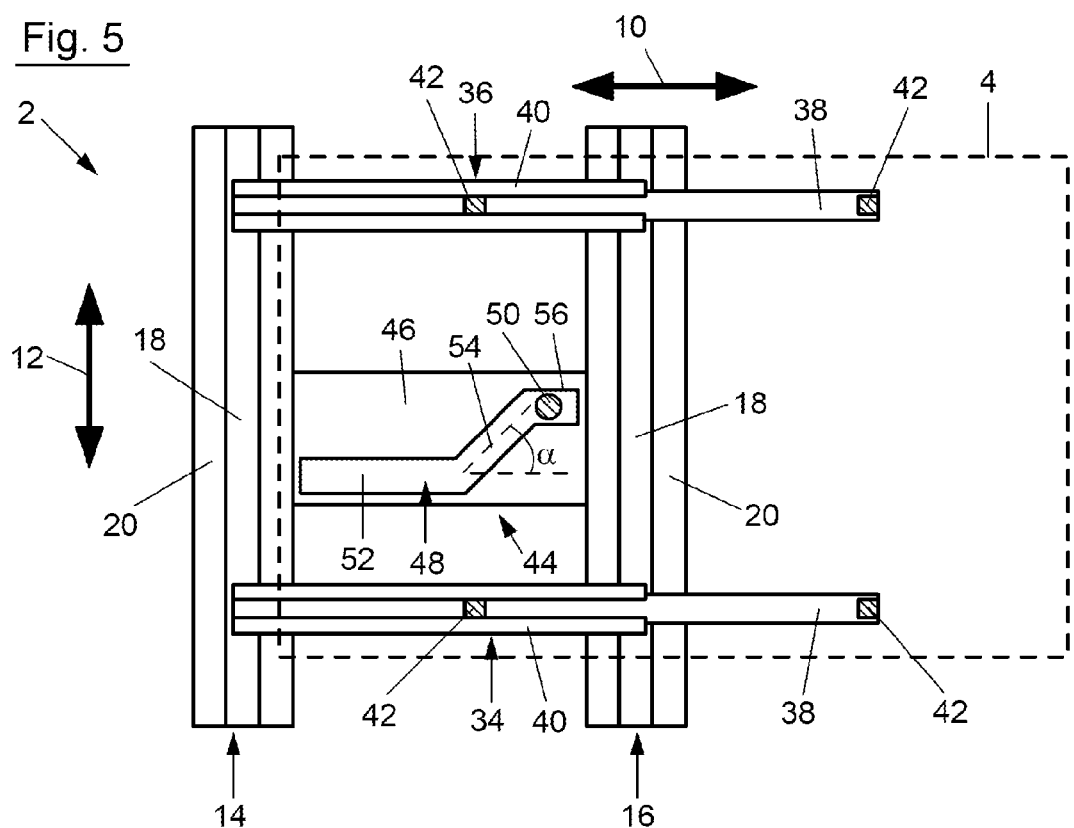

SEAT ARRANGEMENT WITH A FORCED GUIDANCE

CROSS-REFERENCE TO RELATED APPLICATION

This application claims priority to German Patent Application No. 102008004231.5-14, filed Jan. 14, 2008, which is incorporated herein by reference in its entirety.

TECHNICAL FIELD

The present invention relates to a seat arrangement for an automobile comprising a vehicle seat, a longitudinal guide for displacement of the vehicle seat in the longitudinal direction, and a transverse guide for displacement of the vehicle seat in the transverse direction.

BACKGROUND

Known from the prior art are a plurality of seat arrangements, which comprise a vehicle seat, which may be displaced both in the longitudinal direction and in the transverse direction of the automobile. For this purpose, the known seat arrangements have longitudinal guides and transverse guides, which extend in the longitudinal direction or in the transverse direction of the automobile.

Thus, DE 41 10 998 C2 discloses a seat arrangement comprising a vehicle seat, which is disposed displaceably in the longitudinal direction on two longitudinal guides. In this case, the two longitudinal guides are formed by a pair of rails in each case, which extend in the longitudinal direction of the automobile or in the seat direction of the vehicle seat. The two longitudinal guides are in turn disposed transversely displaceably on two transverse guides, which are disposed underneath the longitudinal guides and are connected to the floor panel of the automobile. The transverse guides are in turn each composed of a pair of rails, which extend in the transverse direction of the automobile. The known seat arrangement has the disadvantage inter alia that the rear region below the vehicle seat, which forms the foot well for the passengers on the rear seat row, is restricted by the transverse guides fastened to the floor panel.

EP 0 940 288 B1 discloses a seat arrangement, which substantially has the same structure as the previously described seat arrangement, i.e. the seat arrangement comprises a vehicle seat, which may be displaced over two longitudinal guides in the longitudinal direction and over two transverse guides in the transverse direction of the automobile, the longitudinal guides being guided in the transverse direction on the transverse guides. In contrast to the previously described seat arrangement, however, the transverse guides are disposed within a recess in the floor panel, which likewise extends in the transverse direction. Consequently, the foot well for the passengers on a row of seats located there behind is not so severely restricted as is the case in the previously described prior art. Nevertheless, the handling of this seat arrangement, in particular when shifting the vehicle seat, is likewise difficult.

A further seat arrangement is described in EP 1 140 554 B1. In the known seat arrangement, two longitudinal rails are let into the vehicle floor, which at their rear end go over into two transverse rails, likewise let into the vehicle floor. The relevant vehicle seat has two base elements, at which downwardly pointing connecting parts are provided. The connecting parts engage in the rails let in the vehicle floor, so that the vehicle seat may be displaced along the longitudinal rails in the longitudinal direction of the automobile and along the transverse rails in the transverse direction of the automobile. The handling of this vehicle seat is also difficult since the vehicle seat must first be displaced along the longitudinal rails in the longitudinal direction into its rearmost position so that the connecting parts engage in the transverse rails. Only then is a transverse displacement along the transverse rails possible, i.e. in order to displace the seat in the longitudinal and transverse direction, the seat must first be displaced in the longitudinal direction and then in the transverse direction.

It is therefore at least one object to provide a seat arrangement for an automobile comprising a vehicle seat, a longitudinal guide, and a transverse guide, which ensures particularly simple, rapid, and convenient handling when shifting the vehicle seat. In addition, other objects, desirable features and characteristics will become apparent from the subsequent detailed description and the appended claims, taken in conjunction with the accompanying drawings and this background.

The seat arrangement according to an embodiment of the invention is designed for an automobile and comprises a vehicle seat, which preferably comprises a vehicle seat which is disposed in a seat row, which is disposed in front of a further seat row. At least one longitudinal guide for displacement of the vehicle seat in the longitudinal direction and at least one transverse guide for displacement of the vehicle seat in the transverse direction is provided. The longitudinal and transverse direction is preferably to be understood as the longitudinal and transverse direction of the vehicle seat, and the longitudinal and transverse direction of the vehicle seat preferably also corresponds to the longitudinal and transverse direction of the automobile.

According to an embodiment of the invention, a forced guidance is furthermore provided, this being configured in such a manner that the vehicle seat is automatically displaced in the transverse or longitudinal direction during displacement in the longitudinal or transverse direction. This means that during displacement in the longitudinal direction, the vehicle seat is automatically also displaced in the transverse direction and during displacement in the transverse direction, the vehicle seat is automatically also displaced in the longitudinal direction.

The embodiments of invention on the one hand have the advantage that the vehicle seat need not necessarily be displaced firstly in the longitudinal direction in order to only then be able to displace it in the transverse direction. Furthermore, due to the forced guidance, it is ensured that the vehicle seat may be displaced safely and specifically into a predetermined position. The latter is not ensured in a seat arrangement comprising a vehicle seat which allows a free displacement both in the longitudinal and in the transverse direction. The seat arrangement according to the invention is therefore particularly suitable for vehicle seats inside an automobile, in which the space relationships are restricted in such a manner that the vehicle seat may otherwise occupy only a small number of predetermined positions.

In a preferred embodiment of the seat arrangement according to an embodiment of the invention, the forced guidance is configured in the manner of a sliding block guide.

In a particularly preferred embodiment of the seat arrangement, the forced guidance comprises, on the one hand, a guide groove which is configured as fixed to the vehicle or fixed to the seat and on the other hand, comprises a guide part guided in the guide groove, which is configured as fixed to the vehicle or fixed to the seat. This means that a guide part fixed to the seat would be assigned to a guide groove fixed to the vehicle and a guide part fixed to the vehicle would be assigned to a guide groove fixed to the seat. Due to the guide groove and the relevant guide part, a particularly simple forced guidance in the manner of a sliding block guide is created, which ensures reliable guidance of the vehicle seat into the predetermined positions.

According to a further preferred embodiment of the seat arrangement, the guide groove comprises at least one inclined section, which extends transverse to the longitudinal direction and also transverse to the transverse direction. Due to the inclined section, a displacement of the vehicle seat in the longitudinal or transverse direction can be automatically coupled with a displacement of the vehicle seat in the transverse or longitudinal direction.

In an advantageous embodiment of the seat arrangement, the inclined section extends at an angle between about 0° and about 90° transverse to the longitudinal direction. In order to allow a movement sequence of the vehicle seat that is as flowing as possible, this angle between the inclined section and the longitudinal direction is preferably about 45°.

In order not to couple a longitudinal displacement of the vehicle seat to a transverse displacement of the vehicle seat in every position of the vehicle seat, the guide groove further comprises a first section, which extends exclusively in the longitudinal direction. In this way, a simple and reliable displacement of the vehicle seat in the longitudinal direction is possible without needing to pay attention to its unintentional displacement in the transverse direction.

In a further advantageous embodiment of the seat arrangement, the first section is disposed in front of the inclined section in the direction of travel. Consequently, the longitudinal displacement is only coupled to a transverse displacement when the vehicle seat is already located in a rear position and is displaced from this rear position further rearward in the longitudinal direction.

In a further advantageous embodiment of the seat arrangement, the guide groove furthermore comprises a second section, which extends exclusively in the longitudinal direction. With regard to the advantages of such a second section, reference is made to the preceding description of the first section.

In a particularly advantageous embodiment of the seat arrangement, the second section is disposed after the inclined section in the direction opposite to the direction of travel. Thus, the inclined section is again followed by a section along which the vehicle seat may again only be displaced in the longitudinal direction.

In a further particularly preferred embodiment of the seat arrangement, the inclined section of the guide groove extends transverse to the longitudinal direction in such a manner that during a displacement in the longitudinal direction, the vehicle seat is automatically displaced rearward in the direction of the vehicle center. This embodiment is particularly suitable for a vehicle seat, which may be displaced from a front region of the vehicle interior into a rear region of the same, the rear region of the vehicle interior having a smaller width, for example, due to inwardly projecting wheel cases. The position of the vehicle seat is thus adapted automatically and in a collision-free manner during displacement into the rear region, so that the handling during displacement of the vehicle seat is particularly simple.

In a further advantageous embodiment of the seat arrangement, the vehicle seat may be automatically locked at predetermined locking distances in the longitudinal and transverse direction. Such locking distances can, for example, be one centimeter. The automatic locking at predetermined locking distances simplifies the positioning and locking of the vehicle seat in the desired position.

In order to be able to bring the vehicle seat into the desired position as rapidly as possible, in a further advantageous embodiment of the seat arrangement, an actuating means is provided for releasing the locking. For example, there may be provided an actuating means which allows no automatic locking at predetermined locking distances as long as it is actuated. When the desired position of the vehicle seat is reached, the actuating means may be released to then again allow locking at the predetermined locking distances.

In order not to unnecessarily restrict the foot well for the passengers on the seat row located behind the vehicle seat, in a further advantageous embodiment of the seat arrangement, the vehicle seat is disposed displaceably in the longitudinal direction on the longitudinal guide whereas the longitudinal guide is disposed displaceably in the transverse direction on the transverse guide. The transverse guide is therefore disposed underneath the longitudinal guide on the vehicle floor.

In order to further eliminate any reduction in the size of the foot well underneath the vehicle seat, in a further preferred embodiment of the seat arrangement, the transverse guide is disposed in a recess in the vehicle floor.

In order to further increase the previously specified advantage, in a further particularly preferred embodiment of the seat arrangement, the transverse guide is disposed in the recess in such a manner that the upper side of the transverse guide is disposed in a plane with the upper side of the vehicle floor. In this way, any collision between the feet of the passenger on the rear seat row with the transverse guide may be avoided when the feet are inserted into the foot well below the vehicle seat.

According to a further preferred embodiment of the seat arrangement, a carpet flooring is disposed on the vehicle floor, which flooring extends over the transverse guide in the recess. In this way, on the one hand, contamination of the transverse guide is prevented while on the other hand, undesirable catching of the passenger's feet in the transverse guide is eliminated.

In order to allow a transverse displacement of the longitudinal guide or the vehicle seat despite the carpet flooring, in a further advantageous embodiment of the seat arrangement, the carpet flooring has a slot, which extends above the transverse guide in the transverse direction. The connecting part between the transverse guide and the longitudinal guide can thus extend through the slot and expand these into the corresponding positions. The transverse displacement is not impeded by this means.

BRIEF DESCRIPTION OF THE DRAWINGS

The present invention will hereinafter be described in conjunction with the following drawing figures, wherein like numerals denote like elements, and:

FIG. 3 shows the vehicle seat from FIG. 2 in a first intermediate position;

FIG. 4 shows the vehicle seat from FIG. 2 and FIG. 3 in a second intermediate position; and FIG. 5 shows the vehicle seat from FIG. 2 to FIG. 4 in a rear position.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
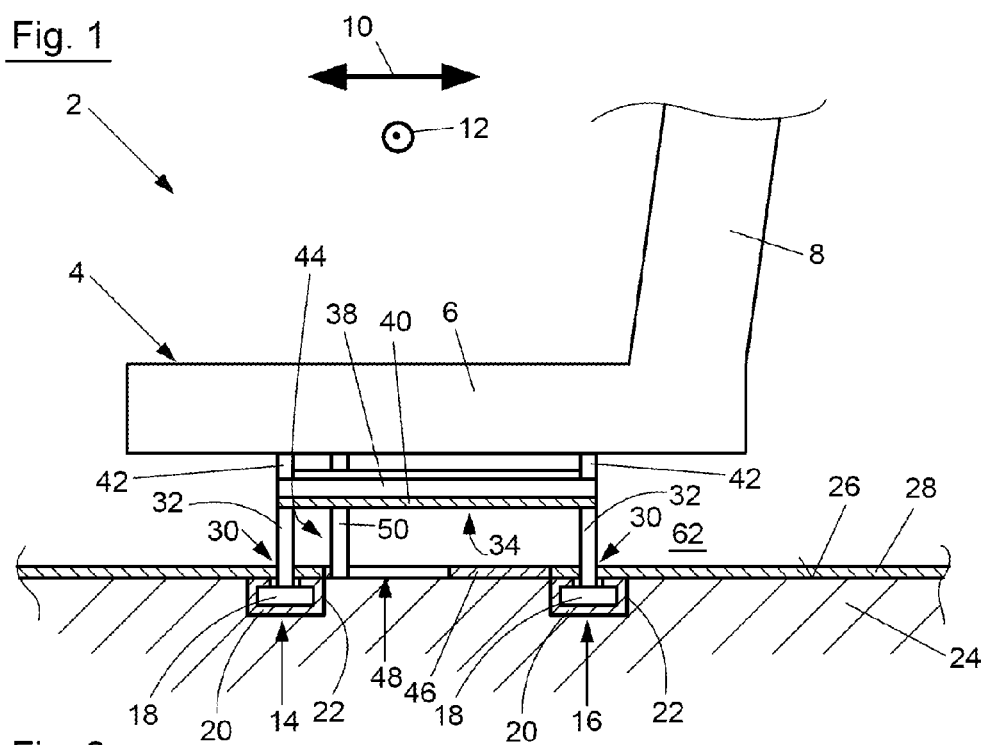
FIG. 1 shows a schematic side view of an embodiment of the seat arrangement according to the invention in partially cutaway view.
Figure 2:
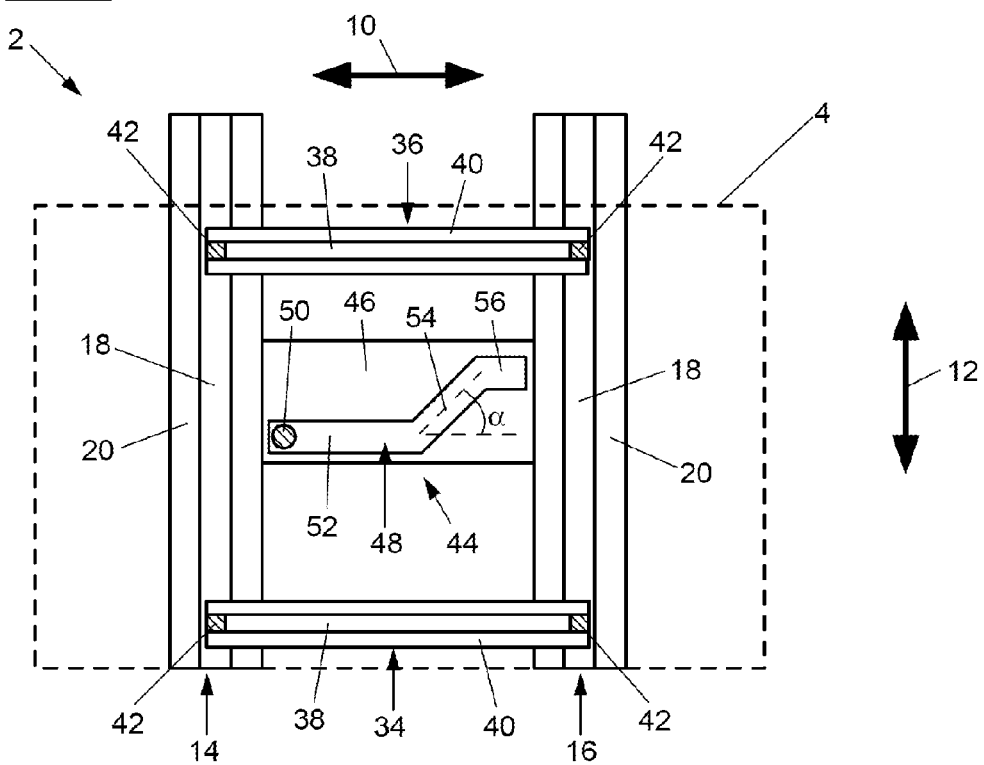
FIG. 2 shows a plan view of the seat arrangement from FIG. 1 with the vehicle seat in a front position.

FIG. 1 shows an embodiment of the seat arrangement 2 in a side view while FIG. 2 shows the seat arrangement 2 in a plan view. The seat arrangement 2 comprises a vehicle seat 4, which comprises a seat part 6 and a backrest 8, and the vehicle seat 4 in FIG. 4 is merely indicated by means of a dashed line to ensure better clarity. The longitudinal direction of the vehicle seat 4 or the automobile is indicated by means of the double arrow 10 in the figures whereas the transverse direction of the vehicle seat 4 or the automobile is indicated by means of the double arrow 12.

The seat arrangement 2 firstly has two transverse guides 14, 16. The transverse guides 14, 16 are spaced apart from one another in longitudinal direction 10 and extend parallel to one another in transverse direction 12. The transverse guides 14, 16 each comprise a first rail 18, which is guided displaceably in transverse direction 12 in a second rail 20. The transverse guides 14, 16 are disposed in corresponding recesses 22 in the vehicle floor 24, the recesses 22 likewise extending in transverse direction 12. The recess 22 and the transverse guides 14, 16 are thereby matched to one another in such a manner that the upper side of the transverse guide 14, 16 is arranged in one plane with the upper side 26 of the vehicle floor 24. A carpet flooring 28, which extends over the transverse guides 14, 16 into the recesses 22, is further disposed on the upper side 26 of the vehicle floor 24. In order to nevertheless ensure a reliable operating mode of the transverse guides 14, 16, the carpet flooring 28 has an elongated slot 30 for each transverse guide 14, 16, which extends in transverse direction 12 above the respective transverse guide 14, 16.

Starting from the first rails 18, a first connecting part 32 and a second connecting part (not shown) extend in each case through the relevant slot 30 upward in the direction of the vehicle seat 4, the first connecting parts 32 being connected to a first longitudinal guide 34 and the second connecting parts (not shown) being connected to a second longitudinal guide 36. The two longitudinal guides 34, 36 are arranged parallel to one another and at a distance from one another in transverse direction 12 while these extend in longitudinal direction 10. The longitudinal guides 34, 46 are each composed of a first rail 38 and a second rail 40, the first rail 38 being guided and longitudinally displaceable in longitudinal direction 10 in the second rail 40. The first or second connecting parts 32 are thereby firmly connected in each case to the second rail 40. Starting from each first rail 38, further connecting parts 42 extend upward in the direction of the vehicle seat, where these are firmly connected to the seat part 6 of the vehicle seat 4. Consequently, the vehicle seat 4 is disposed displaceably in longitudinal direction 10 on the longitudinal guides 34, 36 while the longitudinal guides 34, 36 are disposed displaceably in transverse direction 12 on the transverse guides 14, 16, the transverse guides 14, 16 being disposed underneath the longitudinal guides 34, 36. The transverse guides 14, 16 thus allow a displacement of the vehicle seat 4 in transverse direction 12.

The seat arrangement 2 further comprises a forced guidance 44, which is configured in the manner of a sliding block guide. The forced guidance 44 on the one hand comprises a guide plate 46 fastened to the vehicle floor 24, in which a guide groove 48 is formed. On the other hand, the forced guidance 44 comprises a guide part 50, which is forcibly guided in the guide groove 48. In the present embodiment, the guide groove 48 is therefore configured as fixed to the vehicle while the guide part 50, which is fastened to the seat part 6 of the vehicle seat 4, is configured as fixed to the seat.

The guide groove 48 comprises a first section 52, which extends exclusively in longitudinal direction 10. The first section 52 of the guide groove 48 is disposed in the direction of travel in front of an inclined section 54 of the guide groove 48. The inclined section 54 of the guide groove 48 extends transverse to the longitudinal direction 10 and transverse to the transverse direction 12 at an angle α, which is 45° in the embodiment shown. In principle, the angle α should have an angle between 0° and 90°. At its end facing away from the first section 52, the inclined section 54 goes over into a second section 56, which again extends exclusively in longitudinal direction 10. The second section 56 is consequently disposed after the inclined section 54 in the direction opposite to the direction of travel.

The operating mode and further features of the seat arrangement 2 according to the invention will be described hereinafter with reference to FIG. 2 to FIG. 5. In FIG. 1 and FIG. 2 the vehicle seat 4 is located in a front position. In the front position, the guide part 50 is accommodated in the end section 52 of the guide groove 48 pointing in the direction of travel. If the vehicle seat 4 is now displaced in longitudinal direction 10 rearward into a first intermediate position, the guide part 50 moves rearward within the first section 52 of the guide groove 48, as is indicated by means of the arrow 58 in FIG. 3. A transverse displacement of the vehicle seat 4 in transverse direction 12 is prevented by the edge of the first section 52 of the guide groove 48.

If the vehicle seat 4 is moved further rearward in longitudinal direction 10 starting from the first intermediate position in FIG. 3, the guide part 50 enters into the inclined section 54 of the guide groove 48. The inclined section 54 of the guide groove 48 hereby has the effect that during displacement in longitudinal direction 10 toward the rear, the vehicle seat 4 is automatically also displaced in the transverse direction 12, as is indicated by means of the arrow 60 in FIG. 4. Accordingly, a displacement of the vehicle seat 4 in transverse direction 12 would automatically also effect a displacement of the vehicle seat 4 in longitudinal direction 10, as long as the guide part 50 is located within the inclined section 54 of the guide groove 48.

The inclined section 54 of the guide groove 48 thereby extends transverse to the longitudinal direction 10 in such a manner that during a displacement in longitudinal direction 10 toward the rear, the vehicle seat 4 is automatically also displaced in the direction of the vehicle center. In the present embodiment, this is achieved by the inclined section 54 being inclined in the direction of the vehicle center.

If the vehicle seat 4 is shifted further rearward starting from the second intermediate position in FIG. 4, the guide part 50 ultimately enters into the second section 56 of the guide groove 48, as is indicated in FIG. 5. As long as the guide part 50 is located within the second section 56, a displacement of the vehicle seat 4 is again only possible in longitudinal direction 10.

The vehicle seat 4 can be automatically locked at predetermined locking distances both in the longitudinal and in the transverse direction 10, 12, which may be achieved, for example, by means of suitable locking means (not shown) within the transverse guides 14, 16 or the longitudinal guides 34, 36. In order to be able to release the locking and thus allow a displacement of the vehicle seat 4 in longitudinal and transverse direction 10, 12, an actuating means, not shown, should further be provided. Such an actuating means may, for example, be a suitable handle on the vehicle seat 4.

In addition to the advantage that the handling of the vehicle seat 4 during displacement into predetermined positions is simplified, the embodiment shown further has the advantage that the foot well 62 between the seat part 6 of the vehicle seat 4 and the vehicle floor 24 is not impaired by the rear transverse guide 16 since the rear transverse guide 16 is located inside the recess 22 in the vehicle floor 24. In addition, carpet flooring 28 extending over the transverse guide 16 ensures that the transverse guide 16 is not contaminated.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed summary and description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A seat arrangement for a vehicle with a vehicle floor, comprising:
   a vehicle seat;
   a longitudinal guide coupled to the vehicle seat such that the vehicle seat is configured to be displaceable along a longitudinal axis;
   a transverse guide coupled to the vehicle seat such that the vehicle seat is configured to be displaceable along a transverse axis; and
   a sliding block guide coupled to the vehicle seat and configured to guide the vehicle seat along a displacement path as the vehicle seat is displaced with at least one of the longitudinal guide along the longitudinal axis or the transverse guide along the transverse axis,
   the sliding block guide comprising
      a guide plate defining a guide groove and coupled to the vehicle floor, and
      a guide post coupled to the vehicle seat and disposed in the guide groove to direct the vehicle seat along the displacement path.

2. The seat arrangement according to claim 1, wherein the guide groove comprises at least one inclined section that extends at a first angle ($\alpha$) relative to the longitudinal axis and at a second angle relative to the transverse axis.

3. The seat arrangement according to claim 2, wherein the first angle ($\alpha$) is between about 0° and 90°.

4. The seat arrangement according to claim 1, wherein the guide groove comprises a first section that extends at a first angle ($\alpha$) of approximately 0° relative to the longitudinal axis.

5. The seat arrangement according to claim 4, wherein the guide groove further comprises a second section that extends at a second angle of greater than 0° relative to the longitudinal axis, the first section being disposed forward of the second section in a direction of travel.

6. The seat arrangement according to claims 5, wherein the guide groove further comprises a third section that extends at a third angle of approximately 0° relative to the longitudinal axis.

7. The seat arrangement according to claim 6, wherein the second section is disposed forward of the third section.

8. The seat arrangement according to claim 2, wherein the at least one inclined section of the guide groove is configured to direct the vehicle seat in a first transverse direction while being displaced in a first longitudinal direction, the first transverse direction being toward a center of the vehicle and the first longitudinal direction being toward a rear end of the vehicle.

9. The seat arrangement according to claim 1, further comprising a lock configured to lock the vehicle seat along the displacement path.

10. The seat arrangement according to claim 9, further comprising a lock release for unlocking the vehicle seat along the displacement path.

11. The seat arrangement according to claim 1, wherein the transverse guide is disposed underneath the longitudinal guide on the vehicle floor.

12. The seat arrangement according to claim 11, wherein the vehicle floor defines a recess, and wherein the transverse guide is disposed in the recess.

13. The seat arrangement according to claim 12, wherein the vehicle floor defines an upper side, and wherein the transverse guide comprises a upper portion and is disposed in the recess in such a manner that the upper portion of the transverse guide is disposed in a plane with the upper side of the vehicle floor.

14. The seat arrangement according to claim 12, further comprising carpet flooring disposed on the vehicle floor and extending over the transverse guide in the recess.

15. The seat arrangement according to claim 14, wherein the carpet flooring has a slot extending above the transverse guide.

16. The seat arrangement according to claim 2, wherein the first angle is about 45°.

* * * * *